United States Patent

[11] 3,524,465

| [72] | Inventor | Harry J. Sadler<br>St. Paul, Minnesota |
|---|---|---|
| [21] | Appl. No. | 757,066 |
| [22] | Filed | Sept. 3, 1968 |
| [45] | Patented | Aug. 18, 1970 |
| [73] | Assignee | Hypro, Inc.<br>St. Paul, Minnesota<br>a Corp. of Ohio |

[54] UNLOADER VALVE ASSEMBLY
8 Claims, 8 Drawing Figs.

[52] U.S. Cl. .................................................. 137/115,
137/108, 137/119, 137/118, 137/493.1
[51] Int. Cl. .................................................. F16k 17/04
[50] Field of Search .................................. 137/108,
102, 115, 119, 493.1, 625.68, 118; 239/124, 125,
126, 127

[56] References Cited
UNITED STATES PATENTS

| 2,757,961 | 8/1956 | Nims | 239/127 |
| 2,858,842 | 11/1958 | Reis | 137/108 |
| 3,358,705 | 12/1967 | Krechel | 137/119 |
| 3,358,928 | 12/1967 | Melendy | 239/126 |
| 3,455,322 | 7/1969 | Chichester | 137/108 |

Primary Examiner— William F. O'Dea
Assistant Examiner— William H. Wright
Attorney— Orrin M. Haugen ABSTRACT: A combined unloader and pressure relief valve having an inlet, a normal discharge outlet, and a bypass outlet, the unloader valve portion comprising a valve plunger with a central bore providing communication between said inlet and said normal discharge outlet, and a check valve means disposed within said bore to provide fluid isolation between said inlet and said normal discharge outlet upon substantial interruption of flow with its attendant increase in pressure in the discharge. A radial flange is provided on said valve plunger in communication with the discharge outlet with a surface area sufficient to apply a force to overcome a resilient bias and move the valve plunger axially to a second stable position and thereby providing fluid communication between the inlet and the bypass outlet. A pressure relief valve is interposed in common communication with the inlet and between the inlet and the bypass outlet to provide fluid flow from the inlet to the bypass whenever a predetermined pressure is exceeded in said inlet.

Patented Aug. 18, 1970
3,524,465
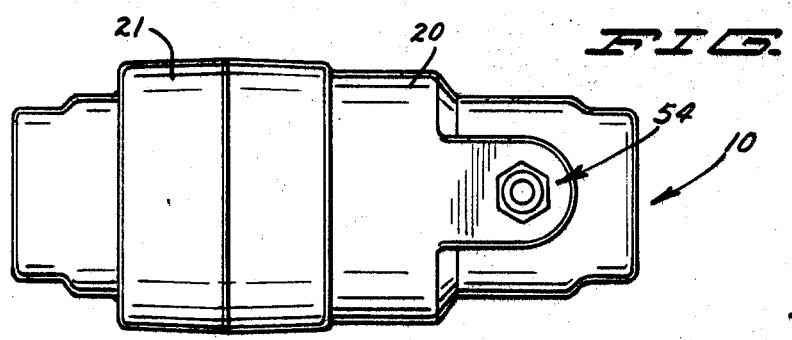
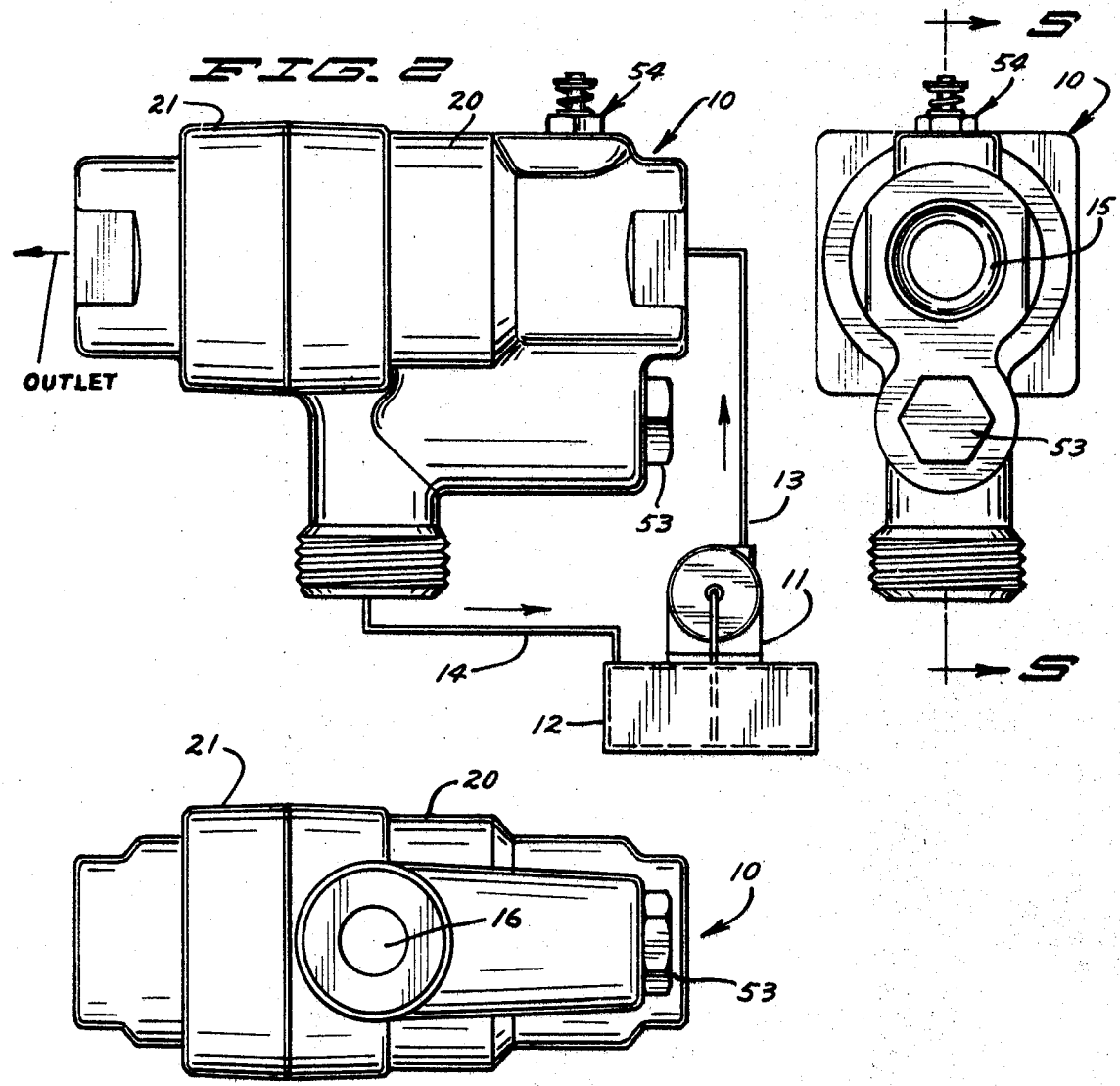
INVENTOR.
HARRY J. SADLER
BY
Orrin M. Haugen
ATTORNEY

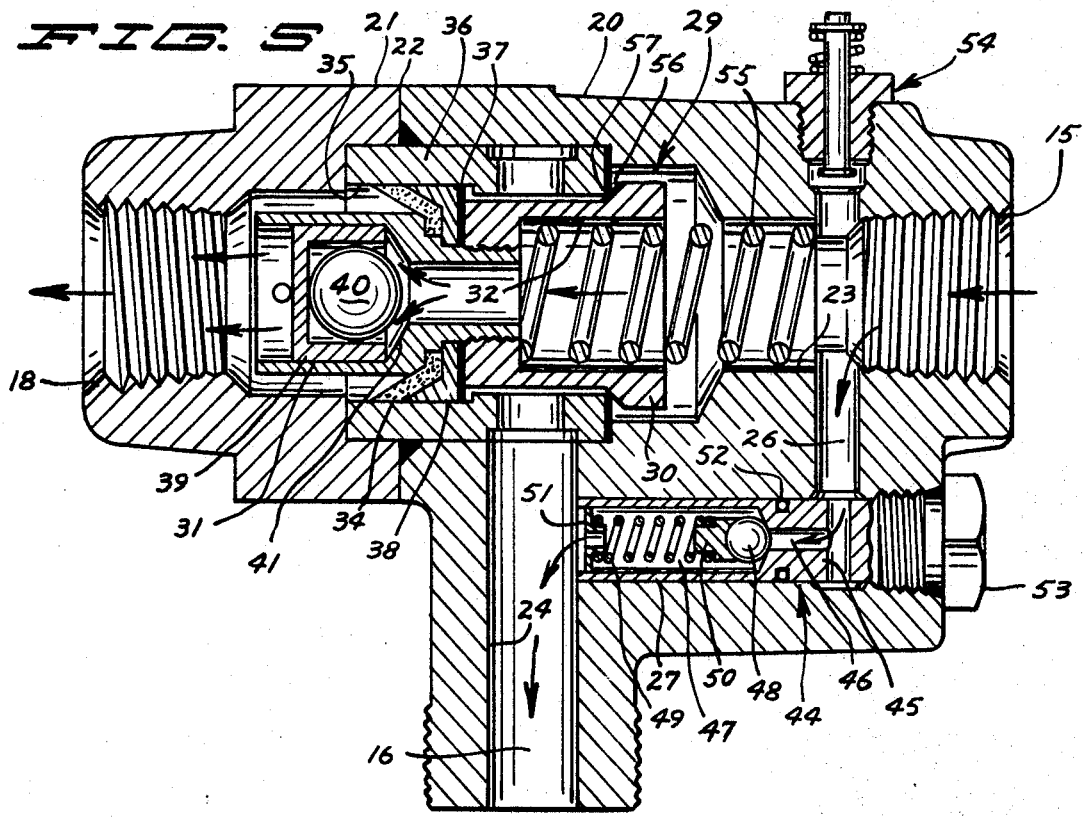

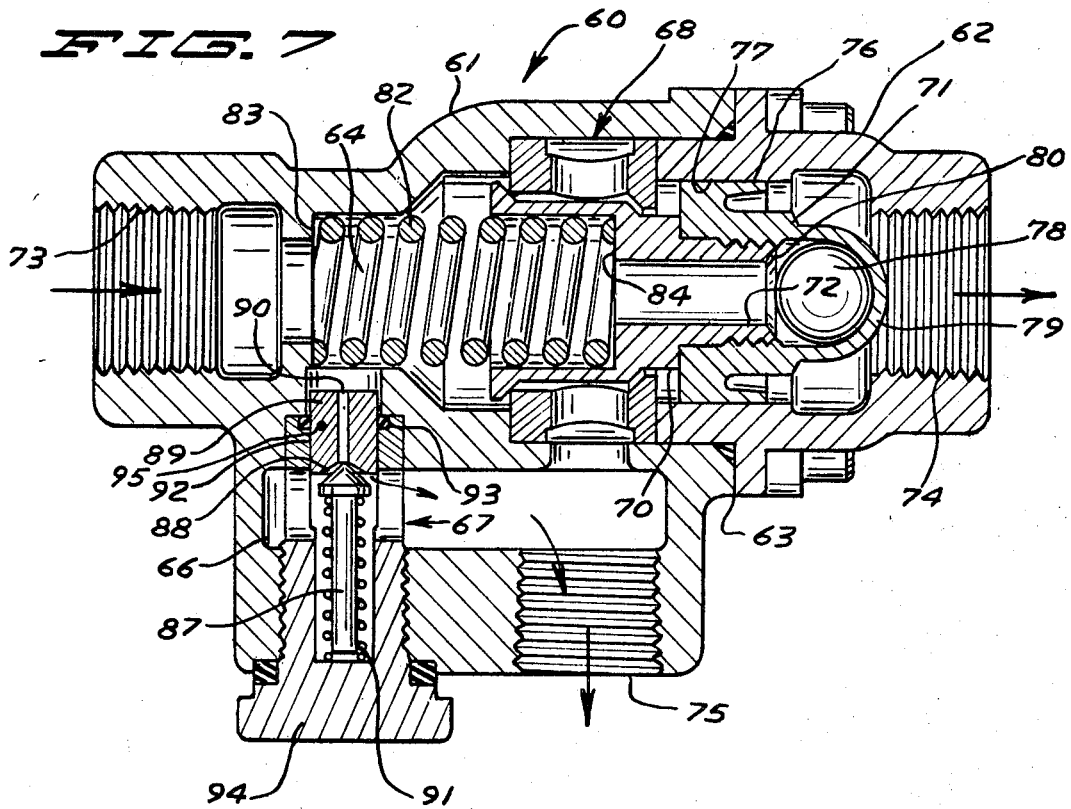
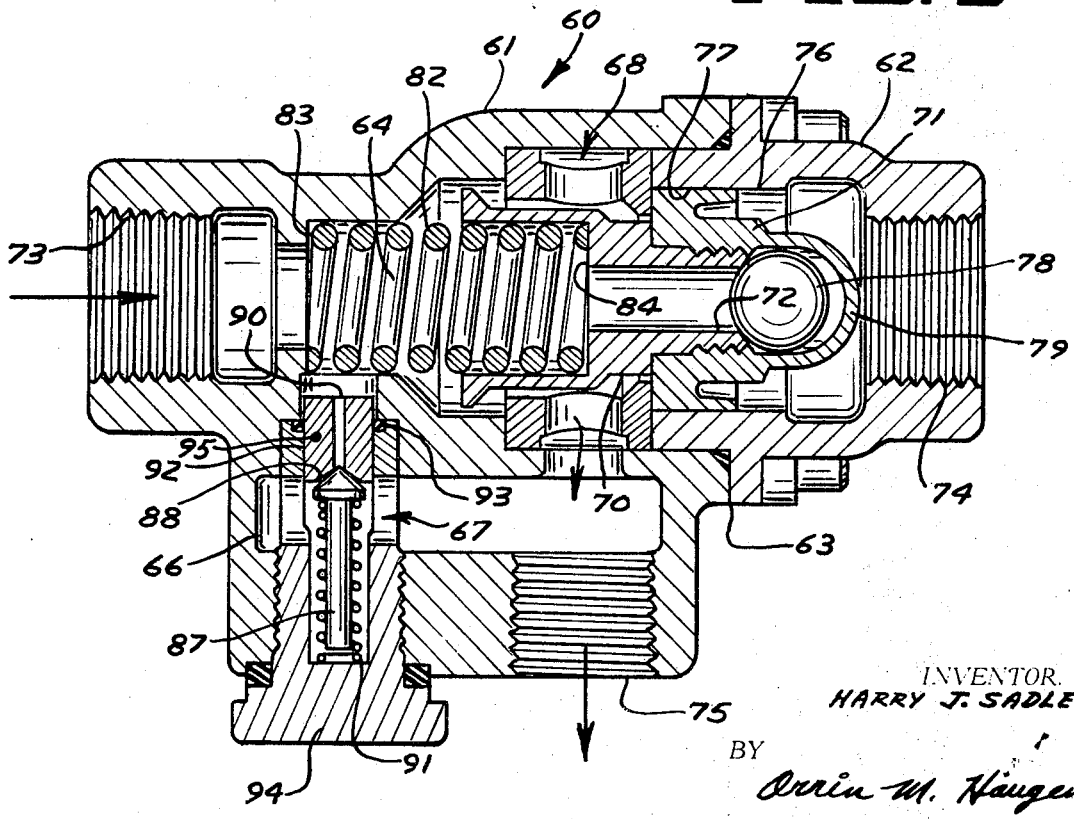

UNLOADER VALVE ASSEMBLY

The present invention relates generally to a combined unloader valve-pressure relief valve assembly, and more specifically to such a structure having an inlet, a normal discharge outlet, and a bypass, the unloader function being accomplished by a valve plunger which is adapted to reciprocate between first and second stable positions, the first position isolating the inlet from the bypass, the second establishing fluid communication between the inlet and the bypass. The pressure relief function is provided by a check valve resiliently biased to permit fluid flow between the inlet and the bypass whenever a certain predetermined pressure is exceeded in the inlet.

In the design of any system for the discharge of fluid under pressure, a number of parameters are ordinarily considered. Among these are the pressure and capacity of the pump, as well as the design of the discharge nozzle. In the manufacture of pumps for delivering fluid at high pressure, conventional manufacturing techniques will ordinarily provide finished products with a certain modest range of tolerances for the desired pressure and capacity characteristics. In the manufacture of nozzles or other discharge orifices, ordinary manufacturing techniques will utilize tolerance levels which will provide individual nozzles or discharge orifices with similarly varying characteristics. When a specific pump is coupled to a specific discharge orifice, therefore, ordinary selection may provide the coupling of a pump with excessive pressure capability with a nozzle having a restricted orifice. Furthermore, in certain use environments, nozzles or discharge orifices are frequently damaged so as to result in a constricted outlet. Continued use of a pump in this environment may result in excessive pressures being developed in the system, these pressures having a deleterious effect on the pump.

In those systems where fluid under pressure is intermittently utilized, the operator employing a shut-off valve in the line, unloader valves are employed to permit the pump to deliver fluid continuously, but through a bypass opening, thus eliminating the build up of pressure in the system. Reciprocating piston pumps will ordinarily require a bypass system of this type if excessive wear is to be avoided. When unloader valves are utilized in this type of operation, a build up in pressure in the discharge may cause the unloader valve to unseat and function as a pulsating relief valve. Such operation will frequently cause erosion of the faces, thus destroying the effectiveness of the unloader valve, this erosion being particularly troublesome when emulsions are being pumped. The present invention utilizes a combined unloader-pressure relief valve which enhances the effectiveness of the unloader valve, and also prevents the pump from operating at excessive pressures, such as pressures in excess of its design capability.

It is therefore an object of the present invention to provide an improved compact unloader-pressure relief valve in a single housing, the pressure relief valve being adapted to open upon experiencing pressures in excess of a certain predetermined pressure, the unloader valve being utilized to establish alternate communication between an inlet, and either a normal discharge outlet, or a bypass.

It is a further object of the present invention to provide an improved unloader-pressure relief valve which employs a single plunger for accomplishing the unloader function, together with a pressure relief valve in the form of a biased check, the unloader valve providing alternate communication between an inlet and either a normal discharge outlet or a bypass, the pressure relief valve providing biased communication between the inlet and the bypass.

It is yet a further object of the present invention to provide an improved combined unloader-pressure relief valve which eliminates the tendency of the unloader valve to function as a pulsating relief valve.

Other and further objects of the present invention will become apparent to those skilled in the art upon a study of the following specification, appended claims, and accompanying drawings wherein:

FIG. 1 is a top plan view of the valve structure prepared in accordance with the present invention;

FIG. 2 is a side elevational view of a typical system employing the valve of the present invention;

FIGS. 3 and 4 are bottom plan and front elevational views respectively of the structure of the present invention;

FIG. 5 is a vertical sectional view taken along the line and in the direction of the arrows 5—5, and showing the valve in a normal operating position, the unloader valve being disposed so as to permit fluid flow between the inlet and the normal discharge outlet;

FIG. 6 is a view similar to FIG. 5, with the unloader valve in a disposition isolating the inlet from the normal discharge outlet, and providing for communication between the inlet and the bypass;

FIG. 7 is a vertical sectional view of a modified form of valve structure showing the valve in a normal operating position, the unloader valve being disposed so as to permit fluid flow between the inlet and the normal discharge outlet; and FIG. 8 is a view similar to FIG. 7, with the unloader valve in a disposition isolating the inlet from the normal discharge outlet, and providing for communication between the inlet and the bypass.

In accordance with one preferred modification of the present invention, the combined unloader-pressure relief valve generally designated 10 is ordinarily employed in the system shown in FIG. 2 which includes a pump 11, a reservoir 12, and schematically shown conduits 13 and 14, conduit 13 coupling the pump 11 to the inlet 15 of the valve 10, conduit 14 coupling the bypass 16 to the reservoir 12. Obviously, a third conduit, not shown, will be utilized to carry fluid from the outlet 18 of the valve 10 to the point of discharge from the system.

The valve 10 comprises a housing which is preferably formed in a pair of mating segments 20 and 21, the segments being adjoined in fluid-tight relationship at a juncture 22, this providing for ease of assembly and disassembly of the device. The housing segments 20 and 21 have a bore 23 which extends through the structure, along with a second transverse bore 24 which communicates with the bore 23, and forms a bypass outlet. In addition, bores 26 and 27 are provided to establish fluid communication between that portion of the bore 23 which forms the inlet 15, and the bore 24.

The unloader function of the structure is accomplished primarily by the valve plunger generally designated 29, this plunger being formed from the two body segments 30 and 31. A bore 32 extends axially through the plunger 29 to establish fluid communication between the inlet 15 and the normal discharge outlet 18. As is further illustrated, the plunger 29 is provided with a radial flange in the form of a cup or the like as at 34, this cup forming a seal with the inner wall 35 of the bore 23, this feature being conveniently provided by the use of an adaptor sleeve member 36. An annular secondary seal 37 may be employed adjacent the cup spreader 38, if desired. The body portion 31 of the valve plunger 29 is provided with a spider 39 which retains a ball-check 40, ball-check 40 being utilized to seat against the seat 41 formed in the plunger 29, and specifically along the extent of bore 32. When a shut-off occurs in the discharge, the ball-check 40 is seated against the seat 41.

Attention is now directed to the pressure relief valve structure shown generally at 44. This valve comprises a body member 45 having an axial bore 46 formed therein, the bore 46 having an enlarged counter-bore 47 which houses ball-check 48, along with a resilient biasing spring member 49 and a receiver 50. A spider 51 is disposed in the bore 47 to anchor spring 49 therein. A seal in the form of an O-ring may be utilized, if desired. Plug 53 is provided to permit access to the pressure relief valve 44.

In some systems, it is desirable to utilize an air bleeder, and this is conveniently provided as at 54.

In operation, the fluid under pressure enters the structure through inlet 15, and passes through bore 32 into the discharge area 18. Spring 55 resiliently biases the unloader valve 29 in the disposition shown in FIG. 5, with the annular projection 56 seated against the seat member 57. When the pressure in the discharge area 18 increases due to a shut-off of the outlet, thus interrupting flow through bore 32. The reaction of the shut-off operation moves ball-check 40 from the position shown in FIG. 5 to the position shown in FIG. 6, this being in seated relationship to the seat 41. The radial flange manifested by cup 34 is then exposed to the full pressure of the system which occurs when a shut-off is experienced, such as by closing the nozzle. With this pressure being exerted on cup 34, the bias available in spring 55 is overcome, and the unloader valve moves to the right as is illustrated in FIG. 6, thereupon opening an annular flow area around the seat 57, into the annular area 59, and out through the bypass.

In order to prevent pulsations in the pumping operation to be reflected in pulsating action of the unloader valve 29, the pressure relief valve 44 will open and accommodate such pressures, thereby avoiding exposure of the pump to conditions of excessive pressure. In addition, the utilization of the pressure relief valve in this environment enhances the stability of the unloader valve while in either operating position.

Attention is now directed to FIGS. 7 and 8 which illustrate another preferred modification of the present invention, the combined unloader-pressure relief valve generally designated 60 being generally similar in function to that valve shown in FIG. 1—6. This valve 60 comprises a housing which is likewise formed in a pair of mating segments 61 and 62, the mating segments being joined together at a fluid-tight juncture 63. These segments have a bore extending therethrough, such as is shown at 64 along with a second transverse bore 65 which communicates with a bore 64 and forms a bypass outlet. In addition, bore 66 is provided which is generally parallel to bore 65, and which is likewise in communication with bore 64 so as to form a retaining zone for the pressure relief valve structure shown generally at 67, the bore 64 being provided for the unloader valve shown generally at 68.

The unloader function of the structure is accomplished in the same manner as that previously discussed in connection with the device shown in FIGS. 1—6. The valve plunger is formed of a pair of body segments 70 and 71, these segments having a through-bore shown at 72 to establish fluid communication between the inlet 73 and the outlet 74 of the valve 60. As is indicated in the drawings, the valve plunger is provided with a sealing flange as shown at 76, this flange forming a firm seal with the wall zone 77 of the bore 64. As is indicated, this flange 76 is integral with the body segment 71, a secondary function of the body 71 being to retain ball 78, as indicated. The base portion 79 of the body 71 is perforated, of course, to permit fluid flow therethrough. In a by-pass disposition, ball 78 will be seated against the seat area 80, as illustrated in FIG. 8. The resilient spring 82 is disposed in compressed disposition between body segment 70 of the valve plunger, and the body portion 61 of the housing, abutment surfaces 83 and 84 being appropriate for retaining the spring 82.

It will be observed that the unloader function of this valve assembly is provided on a "snap-action" basis. This snap-action is achieved by virtue of the design of the unloader valve which is one providing for bi-stable operating dispositions for the unloader valve when in either normal or by-pass disposition. While in the normal disposition, the forward surface of the valve plunger 29 provides an area exposed to the pressure of the inlet side of the line, and the force generated, coupled with the resilient bias of the spring 55 maintains the valve in firm, steady disposition. This disposition is shown in FIG. 5, and is also shown in FIG. 7. Upon closure of the outlet or nozzle, the build up of pressure in the outlet portion of the valve causes the seating of ball checks 40 and 78, and the force applied against the radial flanges 34 and 76 respectively moves the valve plunger bodies to the disposition shown in FIGS. 6 and 8. Upon moving to this disposition, the area differential available between opposite sides of the plunger drops to zero, and accordingly the force urging the valve plunger to a closed disposition is limited to the resilient bias component only. In this disposition, therefore, the system is highly stable and there is no tendency for the plunger to "hunt" or otherwise seek any intermediate disposition. The action is smooth, rapid, and decisive.

Attention is now directed to the pressure relief valve structure shown generally at 67. This valve includes a spring biased check 87 which seats against a seat zone 88 formed in the seat body 89, seat body 89 having a through-bore as shown at 90. Resilient spring member 91 applies a desired force against the member 87 to hold it in seated relationship with the seat 88. A sealing body 92 may be employed with an external O-ring seal as at 93 to receive the seat body 89. Plug 94 is conveniently provided to permit access to the pressure relief valve 67 in a manner similar to that shown in the apparatus of FIGS. 1—6. In operation, the apparatus illustrated in FIGS. 7 and 8 functions substantially identically to that device shown in FIGS. 1-6. For production purposes, the assembly is simplified due to the use of the modified pressure relief valve, and the use of a cup member 76 which is molded as an integral part of the ball-retainer area shown at 79.

In order to obtain uniformity in the production units, the assembly is conducted in a manner so as to eliminate any possibility of variations in forces required to open the pressure relief valve. In this connection, the seat body 89 is illustrated as being locked into place within sealing body 92 by the pin 95, this pin being inserted into locking relationship with the seat body 89 through the sealing body. Thus, the assembler will prepare the sub-assembly, and apply the force necessary against the resilient spring member 91 until the desired force for the pressure relief valve is obtained. At that point, with the force being maintained removed, a bore is formed through the seat body 89 and sealing body 92 for accepting the pin member 95. Thus, each sub-assembly may be made within strict and close tolerance levels.

The pressure relief valves of the present invention may be pre-set to open upon achieving a certain predetermined pressure in the inlet, such as, for example, 300, 500, or 700, psi. The resilient bias available in springs 55 and 82 will be matched to this system, and will be adapted to permit the valve plungers 29 and 70—71 respectively to move to the bypass position when the predetermined upper pressure limit is exceeded or when the outlet or nozzle is closed. Any unusual or anomalous characteristics in the discharge components utilized, such as a nozzle which may be employed and which would ordinarily be reflected in a higher operating pressure are avoided. This occurs since the pressure relief valves will open whenever excess pressures are experienced in the discharge from the pump. For example, a pump which is designed to deliver two gallons per minute at 500 psi through a given nozzle can be protected against excessive pressures which may otherwise develop if damage occurs to the nozzle, any excess capacity being capable of being by-passed from the system through the pressure relief valve.

In order to reduce the inventory required for production, the present apparatus may utilize calibrated spacers in combination with the various resilient spring members to establish settings for the various limits of pressure. An operator may thereby be able to modify the device while in the field.

I claim:

1. Valve apparatus comprising, in combination, a valve housing having an inlet, a first outlet defining a normal discharge, a second outlet between said inlet and said normal discharge defining a bypass discharge, unloader valve means operatively coupled between said inlet and each of said outlets, and a pressure relief valve operatively coupled between said inlet and said bypass discharge;

a. said unloader valve comprising a valve plunger having

1. A bore extending therethrough to permit fluid communication between said inlet and said normal discharge, radial flange means on the periphery of said plunger and adapted for reciprocatory sliding movement within said housing, said plunger being normally resiliently biased to establish communication between said inlet and said normal discharge, and blocking communication between said inlet and said bypass, said housing having passage means providing fluid communication between said normal discharge and said radial flange means;

2. Check valve means interposed in the bore of said valve plunger and being arranged to move axially within said bore to block fluid passage through said bore in response to an increase in pressure in said normal discharge outlet and thereby permit said increased pressure to move said valve plunger against said bias to establish fluid communication between said inlet and said bypass; and b. pressure relief valve means within said housing interposed between said inlet and said bypass and having resilient biasing means maintaining said pressure relief valve in a normally closed disposition for opening when a predetermined pressure in said inlet is exceeded.

2. The valve apparatus as defined in claim 1 being particularly characterized in that the check valve means interposed in said valve plunger is a ball-check.

3. The valve apparatus as defined in claim 1 being particularly characterized in a that the pressure relief valve is a ball-check.

4. The valve apparatus as defined in claim 1 being particularly characterized in that said radial flange means is a flexible resilient annular piston cup.

5. The The valve apparatus as defined in claim 1 being particularly characterized in that communication between the inlet and bypass is through an annular passage zone within said housing circumscribing the periphery of the valve plunger.

6. The valve apparatus as defined in claim 5 being particularly characterized in that said valve plunger seats against an annular seat in said annular passage zone.

7. The valve apparatus as defined in claim 1 being particularly characterized in that a bleeder opening is arranged in fluid communication with said inlet.

8. Valve apparatus comprising, in combination, a valve housing having an inlet, a first outlet defining a normal discharge, a second outlet between said inlet and said normal discharge defining a bypass discharge, unloader valve means operatively coupled between said inlet and each of said outlets, and a pressure relief valve operatively coupled between said inlet and said bypass discharge;

a. said unloader valve comprising a valve plunger having:

1. A bore extending therethrough to permit fluid communication between said inlet and said normal discharge, a radial surface with a certain first forward area exposed to said inlet and a rearward area normally seated against a valve seat, radial flange means on the periphery of said plunger with a certain second area greater than said first area exposed to said first outlet and adapted for reciprocatory sliding movement within said housing, said plunger being normally resiliently biased to establish communication between said inlet and said normal discharge, and blocking communication between said inlet and said bypass, said housing having passage means providing fluid communication between said normal discharge and said radial flange means;

2. Check valve means interposed in the bore of said valve plunger and being arranged to move axially within said bore to block fluid passage through said bore in response to an increase in pressure in said normal discharge outlet and thereby permit said increased pressure to move said valve plunger against said bias to lift said rearward surface from said valve seat to establish fluid communication between said inlet and said bypass to thereby substantially reduce the effective hydraulic force available from said first forward area; and b. pressure relief valve means within said housing interposed between said inlet and said bypass and having resilient biasing means maintaining said pressure relief valve in a normally closed disposition for opening when a predetermined pressure in said inlet is exceeded.